Oct. 17, 1950     W. A. BEDFORD, JR     2,526,532
SPRING CLIP TYPE SNAP FASTENER
Filed June 24, 1948
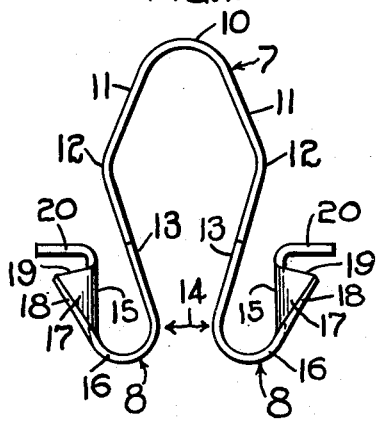
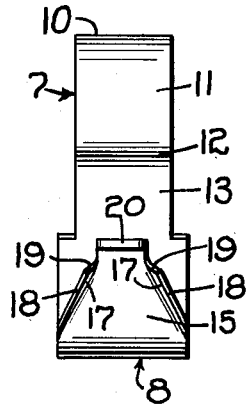
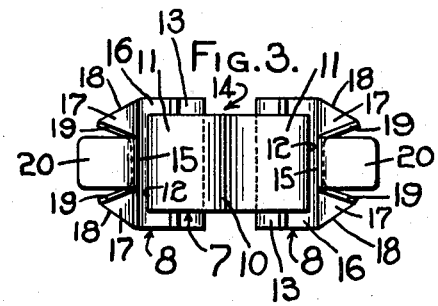
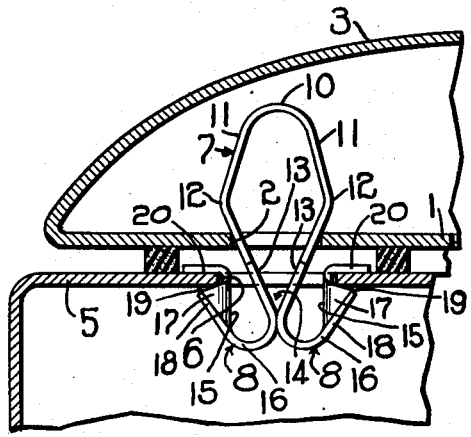
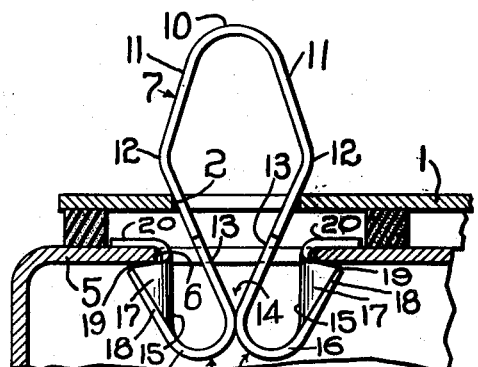
INVENTOR.
WILLIAM A. BEDFORD JR.
BY Philip E. Parker
ATTORNEY.

Patented Oct. 17, 1950

2,526,532

UNITED STATES PATENT OFFICE 2,526,532

SPRING CLIP TYPE SNAP FASTENER

William A. Bedford, Jr., North Scituate, Mass., assignor to United-Carr Fastener Corporation, Cambridge, Mass., a corporation of Massachusetts Application June 24, 1948, Serial No. 35,041

3 Claims. (Cl. 24—73)

The present invention relates to fasteners and more particularly to fasteners of the snap fastener type designed to secure an apertured part to an apertured support and the invention aims generally to improve existing fasteners for that purpose.

A primary object of the invention is the provision of an improved fastener having a part holding stud adapted for snap fastener engagement with an aperture wall of a part to be supported, for example a cover member, and also a support-engaging stud adapted for snap fastener locking engagement with an apertured support.

A further object of the invention is the provision of an improved fastener adapted to have snap fastener locking engagement with a support.

A still further object of the invention is the provision of a simple one piece sheet metal fastener for the purposes above set forth.

The above and other objects of the invention will be apparent to persons skilled in the art to which the invention relates from a consideration of the accompanying drawings and annexed specification illustrating and describing a preferred embodiment of the invention.

In the drawings:

Fig. 1 is a side elevation of a fastener embodying the invention;

Fig. 2 is an edge elevation thereof;

Fig. 3 is a plan view of the fastener shown in Figs. 1 and 2;

Fig. 4 is a side elevation of the fastener in a fastener secured installation comprising an apertured support and an apertured supported part shown in section; and Fig. 5 is a view similar to Fig. 4 and illustrating one type of cover member for which the fastener is particularly adapted.

Referring to the drawings, the fastener is designed primarily for securing a part 1 having an aperture 2 to a support 5 having an aperture 6. The support 5 may be any type or construction, such as a housing or receptacle and the apertured part 1 to be supported thereon may be an inturned flange on a cover member 3, as shown in Fig. 5.

The fastener of the present invention is advantageously formed of a single strip of resilient sheet material, for example sheet metal, said strip being shaped to provide an elongated looped part-engaging stud 7 and spaced support-engaging studs 8. Preferably the central portion of the strip is shaped to provide a rounded entering nose 10 of the stud 7 having diverging arms 11 extending to a plane of maximum width 12 beyond which the arms converge as at 13 toward a neck 14, as clearly shown in Fig. 1.

The opposite converging arms 13 are reversely bent to provide the pair of support-engaging stud members 8 which preferably are of U-shape, the arm 13 constituting one leg and being connected to an opposite leg 15 by means of a bight portion 16. The bight portions 16 thus provide rounded entering noses for the support-engaging studs 8 and face in the opposite direction to the rounded nose 10 of the part-engaging stud 7.

The arms 15 of the support-engaging stud portions are provided with means to engage opposite sides of the apertured wall 5 and preferably such means comprises wings 17 bent angularly to the arms 15 and having a cam edge 18 and shoulder 19, the latter being designed to extend under the inner face of the wall 5. The terminal end 20 of the arm 15 may be outwardly bent to engage over the opposite face of the wall 5 and thus the fastener may be securely locked to the support, having been engaged therewith by a snap fastener action.

It will be apparent that the fastener above described provides laterally spaced support-engaging studs 8 resiliently connected by means of the arms and nose of the part-engaging stud 7 and the studs 7 and 8 are thus oppositely disposed.

As viewed in Fig. 1 the support-engaging studs 8 are normally spaced apart and the overall width, as measured between opposite legs 15, is preferably somewhat greater than the width or diameter of the aperture 6 of the support 5. The fastener may however be snapped in the opening 6, the bight portions 16 acting as entering noses and the wings 17 forcing the arms 13 inwardly toward each other by reason of the sliding engagement of the support wall 5. Thereupon the legs 15 will expand the shoulders 19 under the support and the flanged ends 20 over the support. The fastener is then snap locked in the support with the stud member extending above the support and presenting a resilient snap fastener stud upon which the apertured part 1 may be secured.

While I have illustrated and described one preferred embodiment of the invention, I do not intend to be limited thereto as the scope of the invention is best defined in the appended claims.

I claim:

1. A fastener for securing an apertured part to an apertured support comprising a pair of laterally resilient opposed U-shaped support-engaging members adapted to be inserted in an aperture of a support, the inner adjacent legs of said U-shaped members being connected to form a loop-shaped support-engaging stud, and the outer legs of said U-shaped members having outwardly bent terminal end portions adapted to engage one face of a support and laterally bent intermediate portions spaced from the outwardly bent terminal end portions adapted to engage an opposite face of a support.

2. A fastener for securing an apertured part to an apertured support comprising a single strip of resilient material shaped to provide a part-engaging stud having resilient sides diverging from an axial entering nose to a point of maximum width, said sides converging from said point of maximum width and continuing to opposed reversely bent portions, the outer leg of each of said reversely bent portions having an angularly bent outwardly extending terminal end portion adapted to engage one face of an apertured support and an intermediate laterally bent wing portion having a shoulder thereon adapted to engage an opposite face of an apertured support.

3. A fastener for securing an apertured part to an apertured support comprising a pair of laterally resilient opposed U-shaped support-engaging members adapted to be inserted in an aperture of a support, the inner adjacent legs of said U-shaped members being connected to form a loop-shaped support-engaging stud, and the outer legs of said U-shaped members having outwardly bent terminal end portions adapted to engage one face of a support and laterally bent intermediate wing portions spaced from the outwardly bent terminal end portions, each of said wing portions having an inclined camming edge adapted to slidingly engage the edge of a support aperture and a shoulder adapted to contact an opposite face of a support.

WILLIAM A. BEDFORD, Jr.

REFERENCES CITED

The following references are of record in the file of this patent:

UNITED STATES PATENTS

| Number | Name | Date |
| --- | --- | --- |
| 2,139,567 | Van Uum | Dec. 6, 1938 |
| 2,173,524 | Van Uum | Sept. 19, 1939 |
| 2,178,719 | Cotter | Nov. 7, 1939 |
| 2,201,509 | Van Uum | May 21, 1940 |
| 2,223,622 | Kost | Dec. 3, 1940 |